US011159507B2

(12) United States Patent
Pham et al.

(10) Patent No.: US 11,159,507 B2
(45) Date of Patent: *Oct. 26, 2021

(54) MULTI-DEVICE VERIFICATION VIA NON-AUDIBLE SOUND

(71) Applicant: Capital One Services, LLC, McLean, VA (US)

(72) Inventors: Vincent Pham, Champaign, IL (US); Anh Truong, Champaign, IL (US); Austin Grant Walters, Savoy, IL (US); Jeremy Edward Goodsitt, Champaign, IL (US); Reza Farivar, Champaign, IL (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/654,734

(22) Filed: Oct. 16, 2019

(65) Prior Publication Data
US 2020/0382481 A1 Dec. 3, 2020

Related U.S. Application Data

(63) Continuation of application No. 16/429,887, filed on Jun. 3, 2019, now Pat. No. 10,498,721.

(51) Int. Cl.
H04L 29/06 (2006.01)
G06Q 20/40 (2012.01)

(52) U.S. Cl.
CPC ............ *H04L 63/08* (2013.01); *G06Q 20/40* (2013.01); *H04L 63/0861* (2013.01); *H04L 2463/082* (2013.01)

(58) Field of Classification Search
CPC ......... G06F 21/31; G06F 21/32; H04L 63/08; H04L 63/0861; H04L 2463/082; G06Q 20/40; H04W 12/06
See application file for complete search history.

(56) References Cited

U.S. PATENT DOCUMENTS 10,063,542 B1 * 8/2018 Kao ..................... G10L 17/06
2014/0172430 A1 * 6/2014 Rutherford ............ G06F 3/167
704/273

(Continued)

Primary Examiner — Yogesh Paliwal
(74) Attorney, Agent, or Firm — Kacvinsky Daisak Bluni PLLC

(57) ABSTRACT

A non-transitory computer-readable storage medium storing computer-readable program code executable by a processor to receive a transaction request from a user interface, and receive a user-identifier from the user interface, and the user-identifier associated with a user. The program code may be executable to send a first non-audible sound signal to initiate a multifactor authentication process during a first interval, and send a second non-audible sound signal during a second interval, where the second non-audible sound signal comprises a predetermined frequency pattern, associated with the user. The program code may also be executable to receive a third non-audible sound signal, where the third non-audible sound signal, at least in part, is utilized to determine whether to complete the transaction request or not. The first non-audible sound signal, the second non-audible sound signal, and the third non-audible sound signal may comprise a frequency greater than 15 kHz.

20 Claims, 10 Drawing Sheets

(56) References Cited

U.S. PATENT DOCUMENTS

2016/0087978 A1\* 3/2016 Chow ................. H04L 63/0861
　　　　　　　　　　　　　　　　　　　　713/186
2018/0191804 A1\* 7/2018 Bhaya .................... H04L 67/02

\* cited by examiner

MULTI-DEVICE VERIFICATION VIA NON-AUDIBLE SOUND

RELATED APPLICATION

This application is a continuation of U.S. patent application Ser. No. 16/429,887, titled "MULTI-DEVICE VERIFICATION VIA NON-AUDIBLE SOUND" filed on Jun. 3, 2019. The contents of the aforementioned application are incorporated herein by reference in their entirety.

TECHNICAL FIELD

Embodiments herein generally relate to electronic payment, and more specifically, to multifactor authentication.

BACKGROUND

Multi-factor authentication is increasingly deployed for providing user access to electronic devices, to applications, and for completing transactions, such as purchases to be completed using a computer, tablet device, smartphone, or other device. To facilitate online purchasing, many vendors provide websites where online browsing of items is provided, including the ability to checkout and complete purchasing using visual interfaces provided on a display. While browsing and checkout of items for purchase is readily provided on a desktop, or laptop computer, user-specific authentication via biometric or similar interfaces has not been widely deployed on such devices.

Smartphones, phablets, and tablet devices generally provide a better integrated form of authorization, via fingerprint recognition or other biometric recognition device. Notably, such devices may provide a smaller visual user interface for browsing and purchase from a vendor website, rendering online purchasing less than ideal. Thus, performing online transactions, such as online purchasing, via multifactor authentication, may remain cumbersome.

With respect to these and other considerations, the present disclosure is provided.

BRIEF SUMMARY

In one embodiment, there is provided a non-transitory computer-readable storage medium storing computer-readable program code executable by a processor to receive a transaction request from a user interface, and receive a user-identifier from the user interface, and the user-identifier associated with a user. The program code may be executable to send a first non-audible sound signal to initiate a multifactor authentication process during a first interval, and send a second non-audible sound signal during a second interval, where the second non-audible sound signal comprises a predetermined frequency pattern, associated with the user. The program code may also be executable to receive a third non-audible sound signal, where the third non-audible sound signal, at least in part, is utilized to determine whether to complete the transaction request or not. The first non-audible sound signal, the second non-audible sound signal, and the third non-audible sound signal may comprise a frequency greater than 15 kHz.

In a further embodiment, a device is provided including a user interface, an audio interface, coupled to the user interface, and comprising an audio receiver and an audio transmitter, and a processor, coupled to the user interface and the audio interface. The device may include a non-transitory computer-readable storage medium storing computer-readable program code executable by the processor to: receive an enable signal over the user interface to enable a multifactor authentication application and to receive, during a first interval, a first non-audible sound signal from the audio interface to initiate a multifactor authentication process. The program code may be executable to receive a second non-audible sound signal over the audio interface during a second interval, the second non-audible sound signal comprising a predetermined frequency pattern, associated with the user. The program code may be further executable to request receipt of a user-identifier signal, associated with the user, in response to receipt of the predetermined frequency pattern; and transmit an authentication signal, responsive receipt of the user-identifier signal over the user interface. The first non-audible sound signal and the second non-audible sound signal may comprise a frequency greater than 15 kHz.

In another embodiment, a method may include receiving a transaction request from a user interface, receiving a transaction request from the user interface, associated with a user, sending a first non-audible sound signal to initiate a multifactor authentication process during a first interval. The method may include sending a second non-audible sound signal during a second interval, the second non-audible sound signal comprising a predetermined frequency pattern, associated with the user. The method may include receiving a third non-audible sound signal sent during a third interval, the third non-audible sound signal, at least in part, utilized to determine whether to complete the transaction request or not. The first non-audible sound signal, the second non-audible sound signal, and the third non-audible sound signal may comprise a frequency greater than 15 kHz.

DETAILED DESCRIPTION

Figure 1:
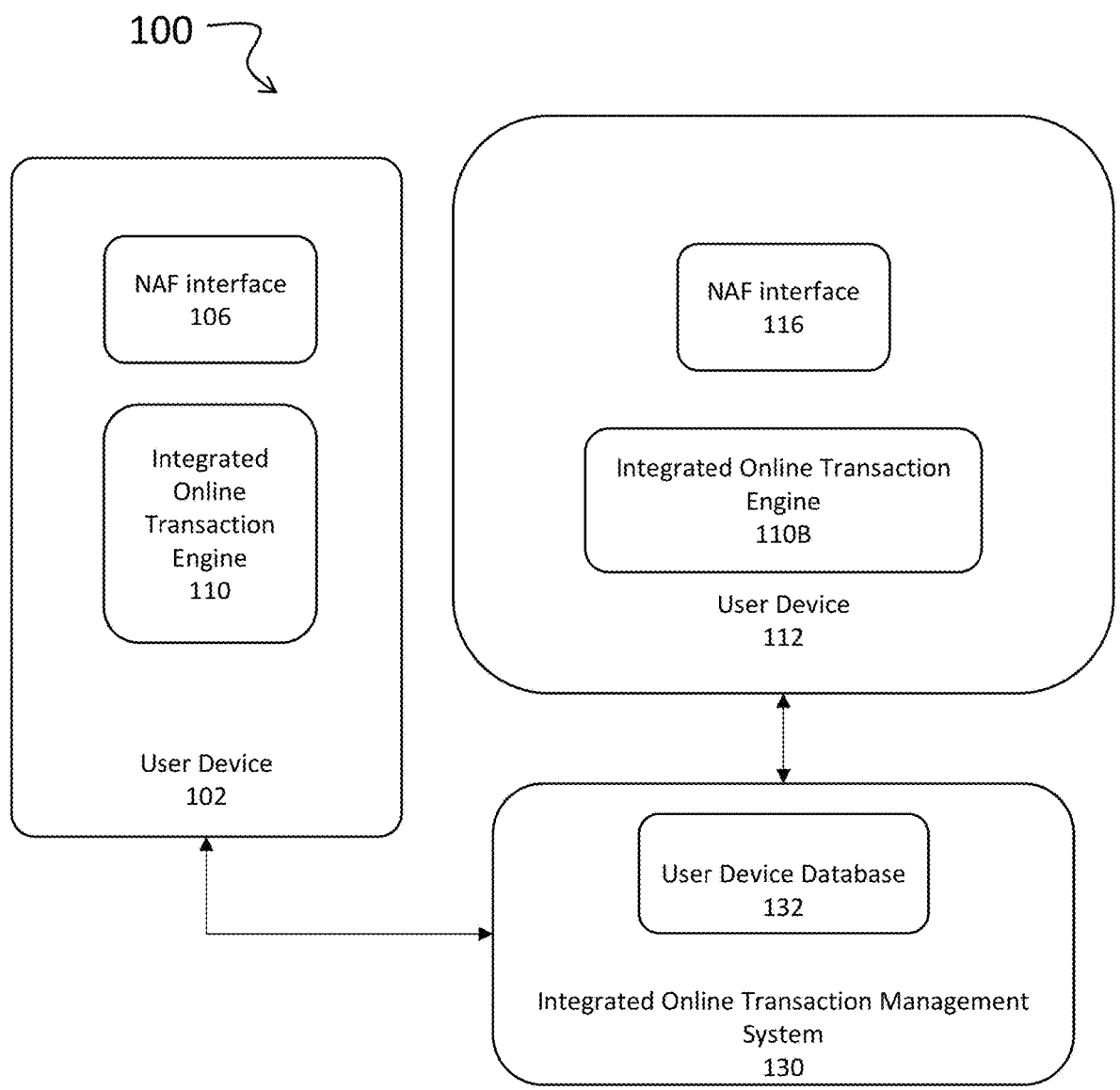
FIG. 1 illustrates an embodiment of a system.

Embodiments disclosed herein provide a system and techniques to interactively manage a customer transaction, such as a spending transaction to be conducted by transaction card, such as a credit card or debit card.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result.

These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include digital computers as selectively activated or configured by a computer program stored within that is written in accordance with the teachings herein, and/or include apparatus specially constructed for the required purpose. Various embodiments also relate to apparatus or systems for performing these operations. These apparatuses may be specially constructed for the required purpose. The required structure for a variety of these machines will be apparent from the description given.

Reference is now made to the drawings, wherein like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modification, equivalents, and alternatives within the scope of the claims.

FIG. 1 depicts a schematic of an exemplary system, labeled a multi-device authentication system 100, consistent with disclosed embodiments. The multi-device authentication system 100 may represent an assembly of different systems and/or devices, including user devices, vendor devices or systems, and financial provider systems and/or devices. The embodiments are not limited in this context, however. The multi-device authentication system 100 may facilitate customer interaction at the point of a transaction, such as an online purchase, for determining whether to complete the transaction, via multi-factor authentication. As such, the multi-device authentication system 100 may play the function of facilitating online purchasing or related online transactions that require multi-factor authentication to complete a purchase.

The multi-device authentication system 100 may generally employ multiple user devices, shown in FIG. 1 as user device 102 and user device 112. Each of these user devices may be an electronic device, such as a smartphone, tablet, phablet, laptop computer, desktop computer, or other electronic device. In some embodiments, the user device 102 may represent a smartphone, tablet, phablet or relatively smaller device, and relatively more portable device, while the user device 112 may represent a tablet, laptop computer, desktop computer, or relatively larger computing device, generally having a larger form factor, and larger device display, in comparison to user device 102. The multi-device authentication system 100 may further include an integrated online transaction management system 130, which system may represent one or more server devices, one or more communication systems, linked over one or more communication networks. The embodiments are not limited in this context. As such, the integrated online transaction management system 130 may be located remotely from a user of the user device 102 and user device 112. In one use scenario, the user device 102 and user device 112 may represent different type of devices, such as a smartphone and laptop computer, respectively. As such the user device 102 and user device 112 may belong to a common user. According to embodiments of the disclosure, a user may register, such as through a website, the user device 102 and user device 112 with the integrated online transaction management system 130, which system may store information related to user device 102 and user device 112 in the user device database 132. As such, the user device 102 and user device 112 may be associated in a common record or database to indicate the two devices belong to a common user.

As further shown in FIG. 1, the user device 102 and user device 112 may include a non-audible frequency interface for communication via non-audible sound. The user device 102 is depicted having a non-audible frequency (NAF) interface, depicted as NAF interface 106, while user device 112 includes a NAF interface 116. The NAF interface 106 and NAF interface 116 may include a combination of audio devices including speaker and microphone/sound receiver, where these components are capable of transmitting soundwaves having frequencies outside of the frequency range of human perception. As an example, known audio components are provided in many computers, smartphone devices, tablets, and the like, where these audio components are capable of sending and receiving ultrasonic sound frequencies, such as frequencies above 15 kHz, above 20 kHz, and so forth. Accordingly, in various embodiments, the NAF interface 106 and NAF interface 116 may include software and/or hardware to generate and receive ultrasonic frequency sound. The user device 102, as well as user device 112 may include an integrated online transaction engine 110 (shown as integrated online transaction 110B for user device 112), where the function of this component is described below. As further disclosed in the embodiments to follow, the user device 102 and user device 112, once registered with the integrated online transaction management system 130, may communicate via NAF to facilitate authentication, such as multi-factor authentication required when performing or completing a transaction, such as a purchase.

Figure 2A:
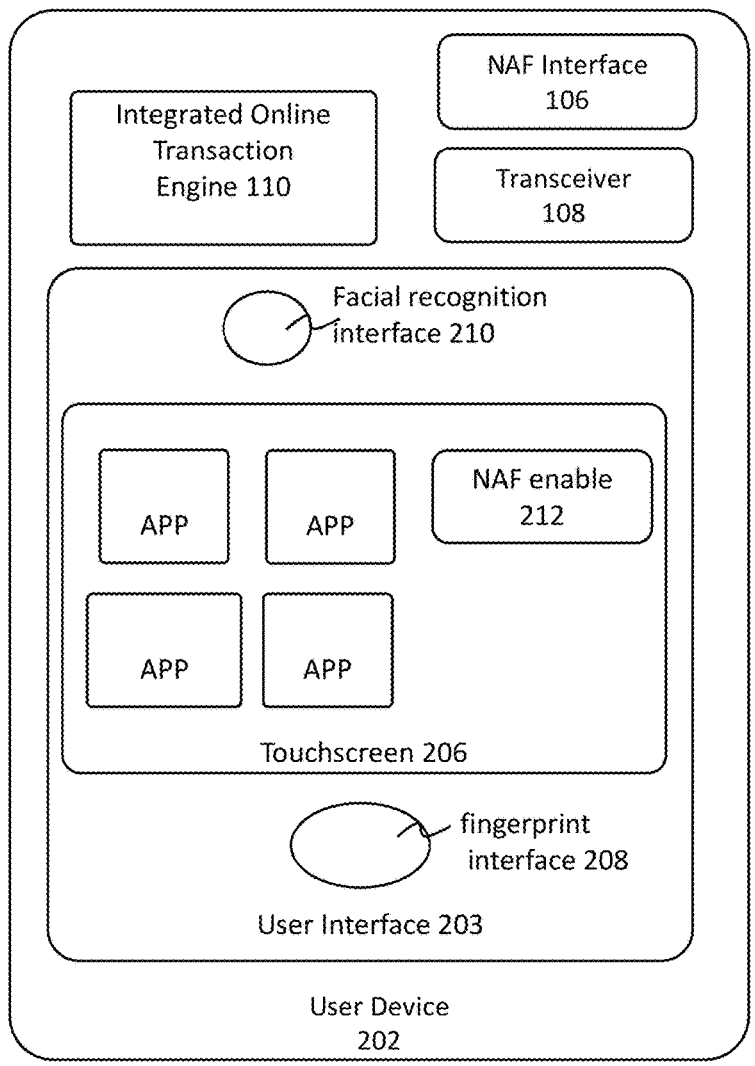
FIG. 2A illustrates an embodiment of a user device.

FIG. 2A depicts a user device 202, which device may represent a variant of user device 102. Said differently, the user device 202 and user device 102 may generally include the same components, including components not specifically shown in user device 102 in FIG. 1. As such, the user device 202 may be a portable electronic device, such as a smartphone. In addition to the aforementioned components, the user device 202 may include a transceiver 108, to transmit and receive radio transmission, such as cellular transmission, WiFi, and so forth. The user device 202 may include various known user interface components, shown as user interface 203, including a touchscreen 206, as well as biometric interfaces, such as a fingerprint interface 208 and facial recognition interface 210. The user device 202 may also include the integrated online transaction engine 110, including logic to facilitate local communication with other electronic devices, as described below.

Figure 2B:
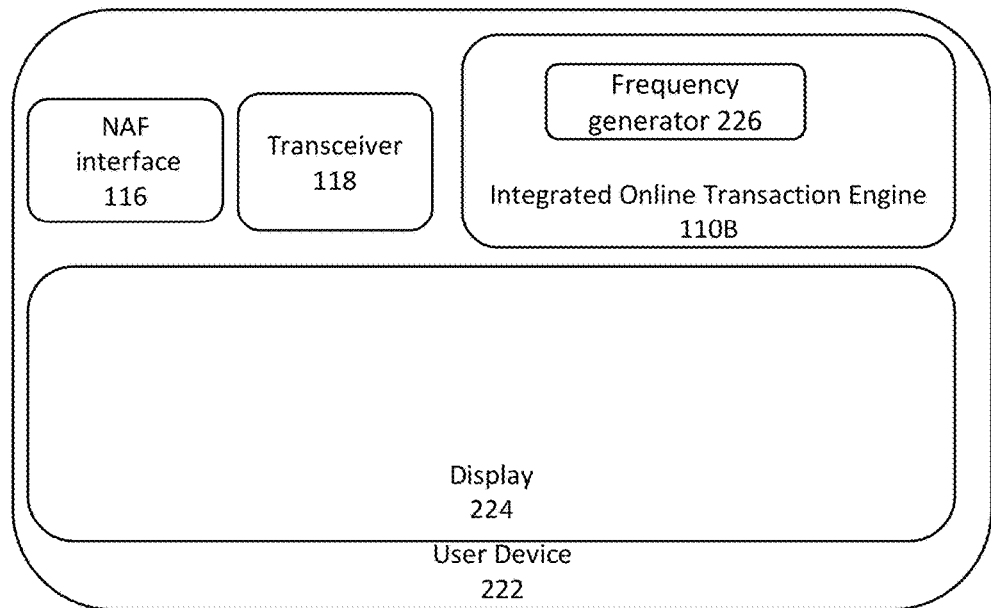
FIG. 2B illustrates an embodiment of a user device.

As an example, the integrated online transaction engine 110 may include logic to enable NAF communications with another user device, shown as user device 222, in FIG. 2B.

In one implementation, NAF communication may be enabled by user input. For example, an application or routine may be enabled via a selection provided on touchscreen 206, such as an icon, a menu item, and so forth. This selection is shown as NAF enable selection 212, provided on touchscreen 206. However, other enable mechanisms are possible. When activated by a user, such as through touch input of an icon, keypad input, voice input, etc. the integrated online transaction engine 110 may enable and direct interactions of user device 202 with other user devices, via NAF communication.

Turning to FIG. 2B there is shown a user device 222, which device may represent a variant of user device 112. Said differently, the user device 202 and user device 102 may generally include the same components, including components not specifically shown in user device 102 in FIG. 1. As such, the user device 222 may be a laptop computer, desktop computer, or similar electronic device. In addition to the aforementioned components, the user device 222 may include a transceiver 118, where the transceiver 118 may include as least a known radio component for local communications, such as WiFi, etc. The user device 222 may also include an electronic display, shown as display 224, where the display 224 may or may not include a touchscreen. The user device 222 may further include components (not shown) including a keypad, keyboard, touchpad, joystick, and so forth.

As depicted in FIG. 2B, the integrated online transaction engine 110B may include a frequency generator 226, where the operation of frequency generator 226 is detailed below. In brief, the frequency generator may generate and manage NAF communications between the user device 222 and other devices that are collocated with the user device 222.

Figure 3A:
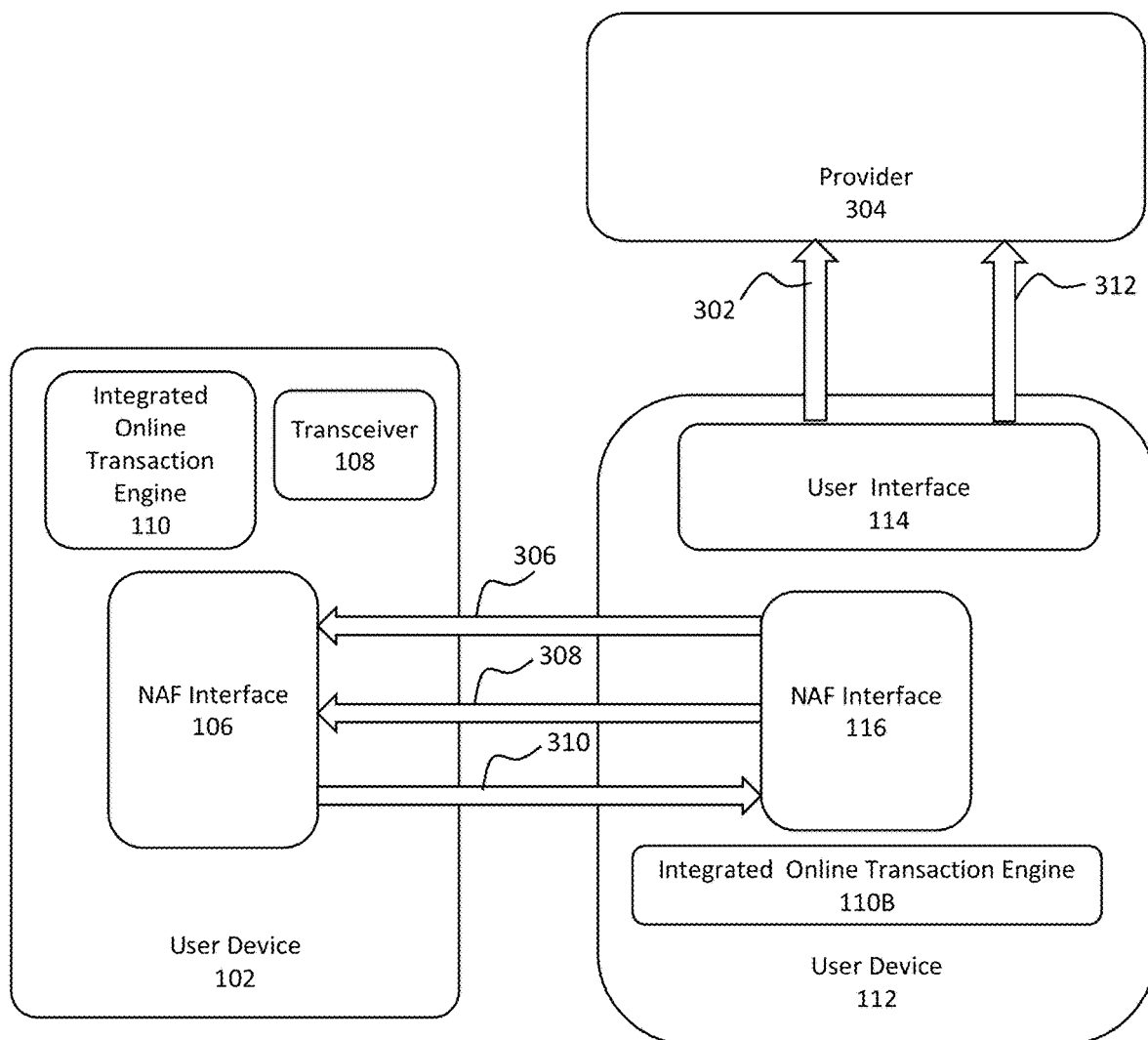
FIG. 3A illustrates one scenario for operation of the system of FIG. 1.
Figure 3B:
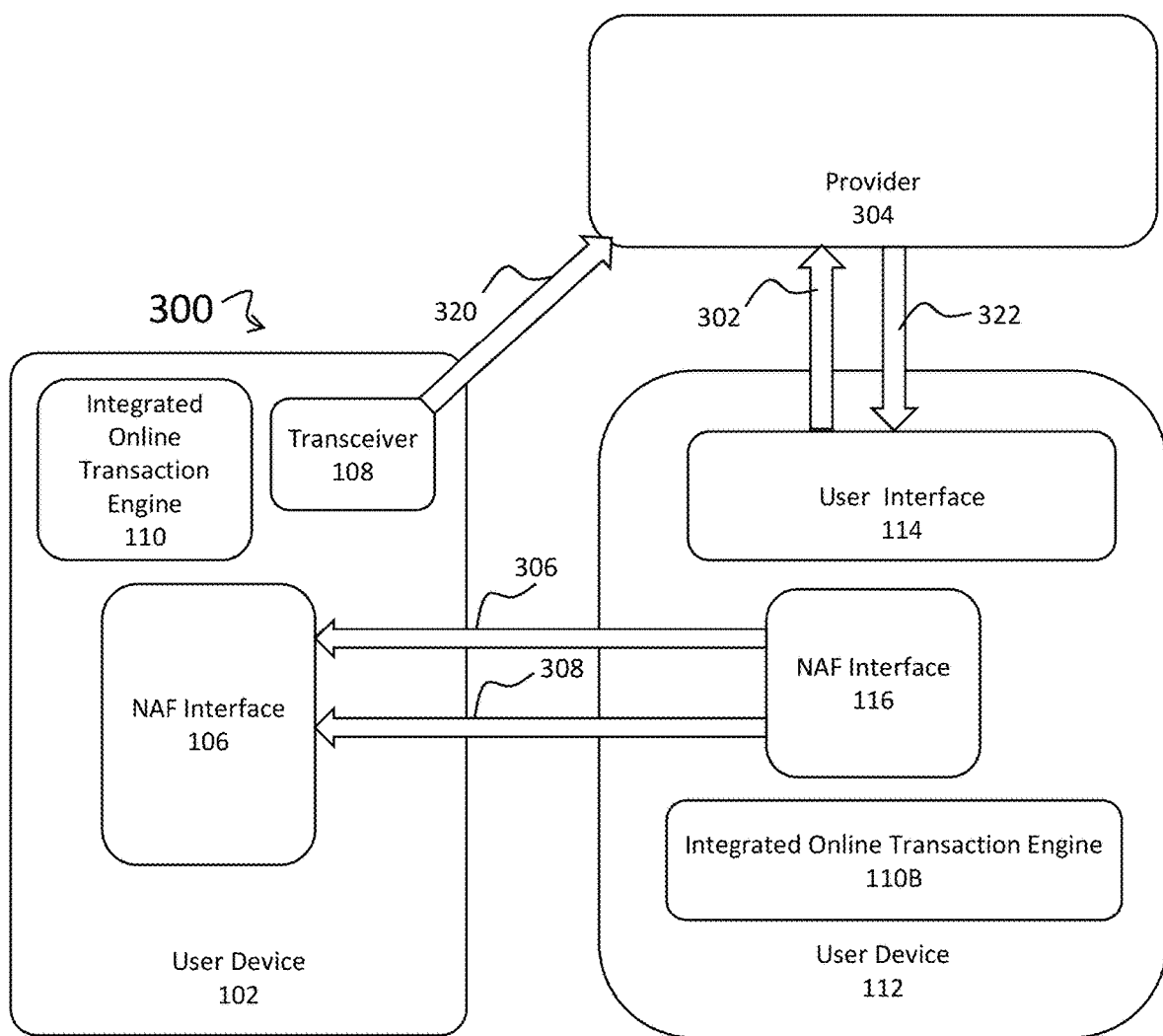
FIG. 3B illustrates another scenario for operation of the system of FIG. 1.

Turning to FIG. 3A, there is shown one example of a use scenario for performing multifactor authentication, according to embodiments of the disclosure. FIG. 3B provides a second example of a use scenario for performing multifactor authentication, according to other embodiments of the disclosure. The scenario of FIG. 3A may be performed by the aforementioned devices as depicted in FIG. 1, FIG. 2A, or FIG. 2B, for example. For purposes of clarity, communication between the user device 202 and user device 222 is shown, with various components omitted. In FIG. 3A, a message 302 is launched by the user device 112 to link to a provider 304. The message 302 may represent a series of operations, including a user browsing a website of the provider 304 on the user device 112, selecting an item for purchase, and enabling multifactor authentication via an external device, such as user device 102. For example, the user device 102 and user device 112 may be provided with a user-selectable component to enable NFA communication, wherein the user of user device 102 and user device 112 may enable NFA communication on both devices.

In one scenario, the provider 304 may require of may solicit authentication before completing a transaction, such as a purchase. At an instance where the user of the user device 102 and user device 112 wishes to complete a transaction, the user may collocate the user device 102 and user device 112, meaning that the user device 202 and user device 112 are within physical proximity to one another, such as within several meters of one another, within one meter of one another, within 50 centimeters of one another, within 20 centimeters of one another. To complete the transaction, the user may provide additional authentication by receiving authentication from the user device 102. For example, when the user clicks on the user device 112 for authorizing payment to the provider 304, the user device 112 may automatically initiate a "handshake," involving a series of MFA communications, to complete authentication of the user to the provider 304. In one example, the integrated online transaction engine 110B may include logic to receive transaction request from a user interface 114 provided by the user device 112, and to automatically send a first non-audible sound signal to initiate a multifactor authentication process during a first interval. For example, upon selecting to complete a transaction on a visual field of the website of provider 304, the user device 112 may generate an ultrasonic beacon through the NAF interface 116, where the ultrasonic beacon is shown as message 306. Examples of ultrasonic beacons may be sound waves having frequencies in a frequency range with a lower limit no less than 15 kHz, no less than 18 kHz, or no less than 20 kHz. The embodiments are not limited in this context.

The first non-audible sound signal, generated by the user device 112, may be sent to activate a nearby device to complete a transaction. In one scenario, the user of user device 112 may also enable other devices to receive NAF communication. For example, the integrated online transaction engine 110 may be coupled to receive input from a user interface of the user device 112 (see NAF enable selection 212) to enable or disable NAF communication, in particular NAF communication with a device registered under a common user record in the user device database 132 (see FIG. 1) of the integrated online transaction management system 130.

Additionally, as further shown in FIG. 3A, the logic of integrated online transaction engine 110B may cause the NAF interface 116 to send a second non-audible sound signal during a second interval, where the second non-audible sound signal comprising a predetermined frequency pattern, associated with the user of the user device 102 and the user device 112. In some examples, the first non-audible sound signal, shown as message 306, and second non-audible sound signal, shown as message 308, may be sound wave forms of varying frequency over time. In particular, the second non-audible sound signal may comprise a frequency sequence (frequency pattern) that is used to identify the user of the user device 112 to any devices within communication range of the user device 112. As such, the user device 102 may be configured, via the integrated online transaction engine 110, to recognize the frequency pattern of the message 308, and to determine that the user device 112 is requesting the user device 102 to initiate an authentication procedure.

Figure 4:
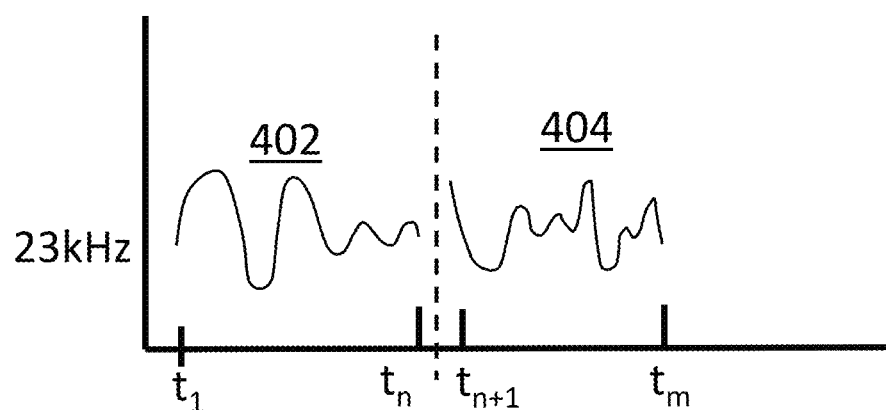
FIG. 4 provides exemplary sound waveforms.

FIG. 4 provides exemplary sound waveforms, shown as frequency pattern 402 and frequency pattern 404, which waveforms may correspond to the message 306 and the message 308, respectively. The frequency pattern 402 may be sent as a sound waveform by the NAF interface 116 between the time t and $t_n$, to alert a user device or set of user devices to start a multifactor authentication procedure. Subsequently, between time $t_{n+1}$ and time $t_m$, the frequency pattern 404 is transmitted, where the frequency pattern 404 identifies the user of the user device 222, and may be unique to the set of user devices associated with user device 222. In various embodiments, the frequency generator 226 may generate the sound waveform as a frequency pattern varying over time. The frequency pattern may be changed according to an algorithm to alter the pattern as time proceeds, to ensure security. For example, the frequency pattern may be transformed given a time t, and a 1 parameter, such that frequency $_{t+1}=\theta$ (frequency t, t, λ). This frequency pattern may be updated across all user devices in communications range with the user device 222.

In various embodiments, the duration between the time t and $t_n$, and or the duration between time $t_{n+1}$ and time $t_m$, t may be on the order of one second, hundreds of milliseconds, or tens of milliseconds. The embodiments are not limited in this context. In some embodiments, the user device 222 will wait for the user device 202 to recognize the frequency pattern 402, which recognition may take less than a second, and then sends the frequency pattern 404, so that the total elapsed time between t and time $t_m$, may be less than three seconds, and in some cases less than two seconds, or less than one second.

In the non-limiting example of FIG. 4, the frequency pattern 402 and frequency pattern 404 fluctuate in frequency in a range near 23 kHz. Notably, most humans cannot perceive sound frequencies above 20 kHz, while most humans over the age of 40 cannot perceive sound frequencies above 15 kHz. Accordingly, the frequency patterns used in the present embodiments will generally not be perceivable as sound by humans. Moreover, frequency patterns or sounds may be generated that are completely inaudible to humans (40 kHz or above), yet are readily audible to any microphone, such as in the NAF interface 106 or NAF interface 116. Accordingly, in some embodiments, the frequency patterns may center in frequency around higher frequencies, such as 30 kHz or 40 kHz.

Returning to FIG. 3A, after sending the message 308, the message may be received by user devices configured to receive the frequency pattern of the message 308, as exemplified in frequency pattern 404. The user device 102, upon receiving the message 308 may perform certain operations and return a message 310 to the user device 112, as detailed further below. The message 310 may be a third non-audible sound signal, configured as a frequency pattern as generally described with respect to FIG. 4. In some examples, where the message 308 corresponds to a predetermined frequency pattern, the message 310 may constitute a second predetermined frequency pattern, based upon the first predetermined frequency pattern. For example, when the message 308 is transmitted as frequency pattern 404, the message 310 may simply constitute the same frequency pattern, namely frequency pattern 404. In other embodiments, the message 310 may constitute a transform of the frequency pattern 404, where the second predetermined pattern is transformed in a manner known to the user device 112. Thus, the user device 112 may recognize the message 310 as having been transmitted from an associated device, and may take actions accordingly. For example, the message 310, constituting a third non-audible sound signal in the handshake initiated by user device 112, may be used, at least in part, to determine whether to complete the transaction request or not. More particularly, the logic of integrated online transaction engine 110B may be executable by a processor of user device 112 to send instructions or to send a signal to complete the transaction request with provider 304, upon receipt of the correct NAF message. Said differently, the integrated online transaction engine 110B may send a confirmation message 312 via a website of provider 304 to complete authentication, when the message 310 corresponds to the second predetermined frequency pattern that is derived from the predetermined frequency pattern sent by user device 112 in message 308.

On the other hand, when the third non-audible sound signal of the handshake (that is, message 310) does not correspond to the second predetermined frequency pattern that is expected by user device 112, the integrated online transaction engine 110B may be executable by the processor of user device 112 to ignore the third non-audible sound signal. For example, if an unregistered device, not associated with user device 112, transmits an ultrasonic beacon that is received by NAF interface 116, the ultrasonic beacon will not have the second predetermined frequency pattern, and will not therefore serve to complete the multifactor authentication process. Thus, the pending transaction on the website of provider 304 is not completed until an NAF message is received having the expected frequency pattern.

In some embodiments, the user device 112 may suspend or cancel a pending transaction if the expected frequency pattern is not received within a predetermined response time. In other embodiments, the frequency patterns, such as frequency pattern 402 and frequency pattern 404 may be generated and transmitted up to a predetermined threshold number of instances, such as three times, before a transaction is suspended or canceled by the user device 112.

In still other embodiments, after the frequency pattern 402 and frequency pattern 404 have been transmitted, and have failed to elicit return of the expected frequency pattern, the Integrated Online Transaction Engine 110B may automatically generate a query on the user device 112 to ask if the user wishes to send the frequency patterns (of FIG. 4) again. In particular implementations, the query as to whether to resend the frequency patterns may take place after a single transmission after a predetermined response time has elapsed without receipt of the expected frequency pattern. In other embodiments, the query may be presented on the user device 112 after a predetermined number of transmissions of the frequency pattern 402 and frequency pattern 404 have failed to elicit return of the expected frequency pattern, During the authentication process of FIG. 3A, the user device 102 will execute a series of operations before sending the message 310 to be received by user device 112. The integrated online transaction engine 110 of user device 102 may include logic to enable multifactor authentication handshake, upon receipt of the correct audio signal. For example, the logic may executable on a processor of user device 102 to receive an enable signal over the user interface 203 (see FIG. 2A) to enable a multifactor authentication application. The enable signal may be provided over NAF enable selection 212, discussed above. Once the user of user device 202 enables this state, the integrated online transaction engine 110 may be coupled to the NAF interface 106 to communicate via non-audible sound signals, with certain devices, registered in user device database 132, for example (see FIG. 1).

Moreover, integrated online transaction engine 110 may include logic executable to receive, during a first interval, a first non-audible sound signal from the NAF interface 106 to initiate a multifactor authentication process. In the scenario of FIG. 3A, as discussed above, the first non-audible sound signal may be received by the NAF interface 106 in the message 306. Once the user device 202 is thus activated, the integrated online transaction engine 110 will be operative to receive a second non-audible sound signal (see message 308) over the NAF interface 106 during a second interval, where the second non-audible sound signal is in the form of a predetermined frequency pattern (see frequency pattern 404, discussed above). The integrated online transaction engine 110 may be primed to look for a predetermined frequency pattern, and may be executable to request receipt of a user-identifier signal, associated with a user of the user device 202, in response to receipt of the predetermined frequency pattern.

According to different embodiments, the user-identifier signal may take different forms. In one embodiment, the user-identifier-signal may be received over a biometric interface, such as fingerprint interface 208 or facial recognition interface 210 (see FIG. 2A).

In other embodiments, the user-identifier-signal may constitute an alphanumeric code that is provided through the user interface 203, such as by a touchscreen, keypad, virtual keypad, etc. In one embodiment, the integrated online transaction engine 110B may be executable to generate the code, to be displayed on the user device 112, at the time when the authentication handshake shown in FIG. 3A is conducted. Thus, at the time message 308 is transmitted, the display on user device 112 may generate and provide the code to be entered on user device 102, to act as a user-identifier signal. Since the user device 102 and user device 112 are collocated, within audio communications range, such as less than one meter, the user may simply glance at the display on user device 112 to read the authentication code to be entered in the user device 202.

In additional embodiments, the user-identifier signal may constitute a combination of signals, such as a signal from a biometric interface of user device 102 (see FIG. 2A for details), and an authentication code to be entered over the user interface 203.

According to various embodiments, the integrated online transaction engine 110 may be executable to transmit an authentication signal, responsive to receipt of the user-identifier signal over the user interface 203. As shown in the scenario of FIG. 3A, the authentication signal comprises a third non-audible sound signal, sent over the audio interface (NAF interface 106) in the form of message 310, discussed above.

While the scenario of FIG. 3A depicts authentication via NAF communication of message 310 from user device 102 to user device 112, in other embodiments, authentication may proceed via other means. For example, the authentication signal generated by user device 102, responsive to receipt of a user-identifier signal, may constitute an electronic signal, electric signal, or electromagnetic signal, to be transmitted from the over a data network. Turning now to FIG. 3B, there is shown a scenario where authentication to complete a purchase may proceed initially similarly to the scenario of FIG. 3A, including the generation of message 302, message 306, and message 308 by user device 112. Likewise, upon receipt of the message 308, the integrated online transaction engine 110 of user device 102 in scenario of FIG. 3B may request a user-identifier signal, such as a biometric user-identifier, and/or an authentication code, and, upon receipt of the user-identifier signal, may generate an authentication signal. In this scenario, the authentication signal is generated as a message 320, to be transmitted from transceiver 108. In one embodiment, the message 320 may be transmitted as a data message over a WiFi link, and thence to a website of the provider 304. In another embodiment, the message 320 may be transmitted as a data message over a cellular communications link to the provider 304. The website of provider 304 may then send the message 322 to user device 112 to complete the pending transaction.

In additional embodiments of the disclosure, completion of a transaction requiring multifactor authentication may proceed among three or more devices. For example, a user may register three or more devices in the user device database 132. To perform an online purchase, the user may employ one of those devices, such as a laptop, to browse the website of a provider. In one implementation, before completion of the transaction, the laptop may broadcast non-audible sound signals to be received by two or more devices within communications range of the laptop, in order to perform a three-device authentication procedure.

Figure 5A:
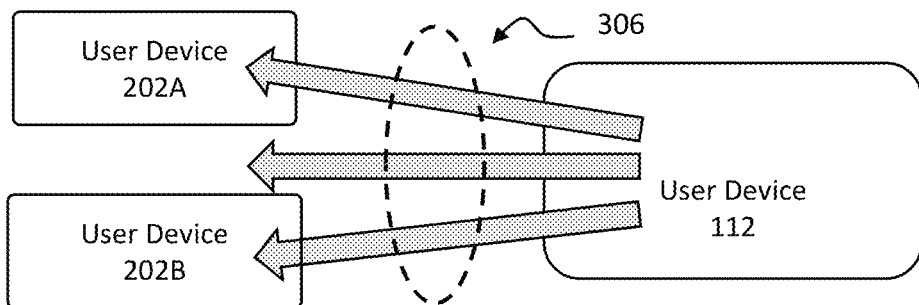
FIGS. 5A-5D shows a scenario for performing multi-device, multifactor authentication, using non-audible sound signals, in accordance with embodiments of the disclosure.
Figure 5B:
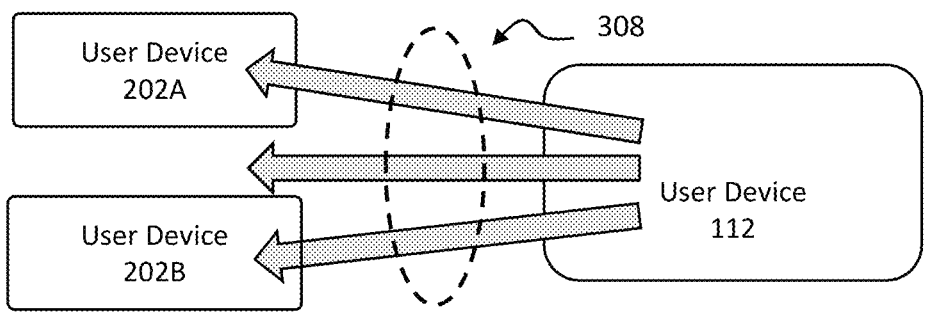

Turning to FIGS. 5A-5D, there is shown a scenario for performing multi-device, multifactor authentication, using non-audible sound signals, in accordance with embodiments of the disclosure. In FIG. 5A and FIG. 5B the message 306 and the message 308 are broadcast, respectively, from the user device 112. The message 306 and message 308 may be configured generally as described above with respect to FIG. 3A. In the scenario of FIG. 5A and FIG. 5B, a pair of user devices, shown as user device 202A and user device 202B, are maintained within audio communications range of user device 112. The user device 202A and user device 202B may be configured similarly to user device 202, wherein an NAF enable selection 212 may be provided to allow a user to enable non-audible frequency communication with other registered devices, such as user device 222.

As such, when the message 306 is broadcast, such as in an ultrasonic beacon, the message 306 may be received at an NAF interface (not separately shown) provided in each of user device 202A and user device 202B. The message 306 may prime the user device 202A and user device 202B to activate a multi-factor authentication procedure.

Likewise, after receiving the message 308, and recognizing the predetermined frequency pattern (see frequency pattern 404), the user device 202A and the user device 202B may be configured similarly to user device 202, to request receipt of a user-identifier from a user interface (not separately shown, but see user interface 203 of FIG. 2A) provided in both user device 202A and user device 202B. In one implementation, the user may provide a biometric user-identifier signal by engaging a biometric interface, provided on each of user device 202A and user device 202B.

Figure 5C:
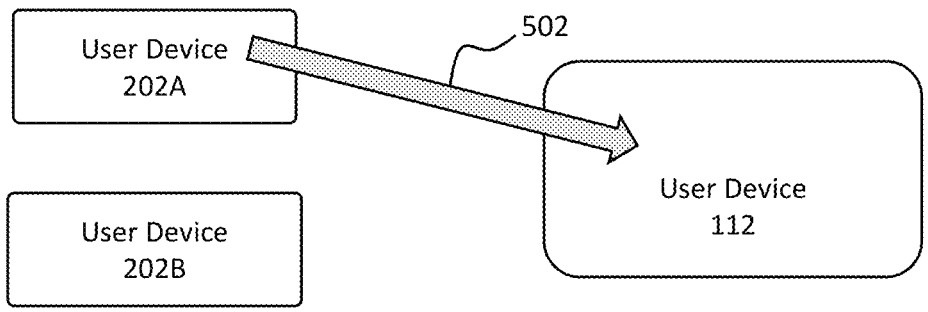

In FIG. 5C, upon receipt of a user-identifier signal, the user device 202A may generate an authentication signal, to be transmitted in a message 502, as a non-audible sound signal. Following the example of FIG. 3A, the message 502 may correspond to second predetermined frequency pattern, derived from a predetermined frequency pattern of message 308, such as frequency pattern 404.

Figure 5D:
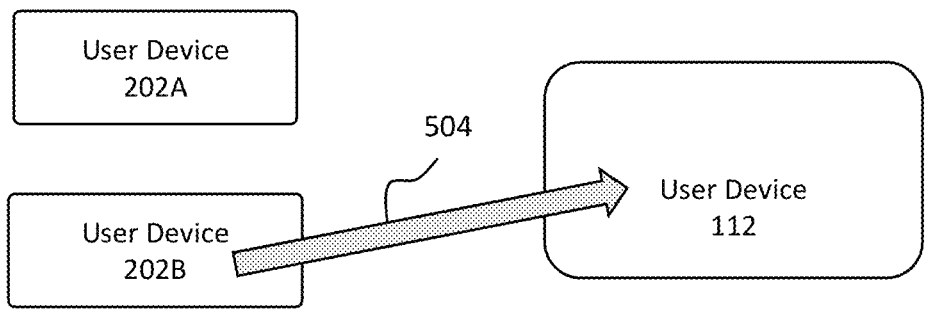

In FIG. 5D, upon receipt of another user-identifier signal, the user device 202B may generate an authentication signal, to be transmitted in a message 504, as a non-audible sound signal. In this scenario, the message 504 may correspond to third predetermined frequency pattern, derived from the predetermined frequency pattern of message 308. As such, the Integrated online Transaction Engine 110B may be executable to receive multiple different NAF messages before completing authentication. For example, the integrated online transaction engine 110B may be executable to send instructions to complete a transaction request at the website of provider 304 when a message constituting the second predetermined frequency pattern (message 502), and when a message constituting the third predetermined frequency pattern (message 504) are received. If both of these messages are not received, the transaction is not completed. In this manner, an extra layer of authentication may be readily executed by providing two mobile devices, for example, in close proximity to a laptop computer. While in some embodiments the third predetermined frequency pattern may be different than the second predetermined frequency pattern, in other embodiments, the third predetermined frequency pattern may be the same as the second predetermined frequency pattern.

Figure 6:
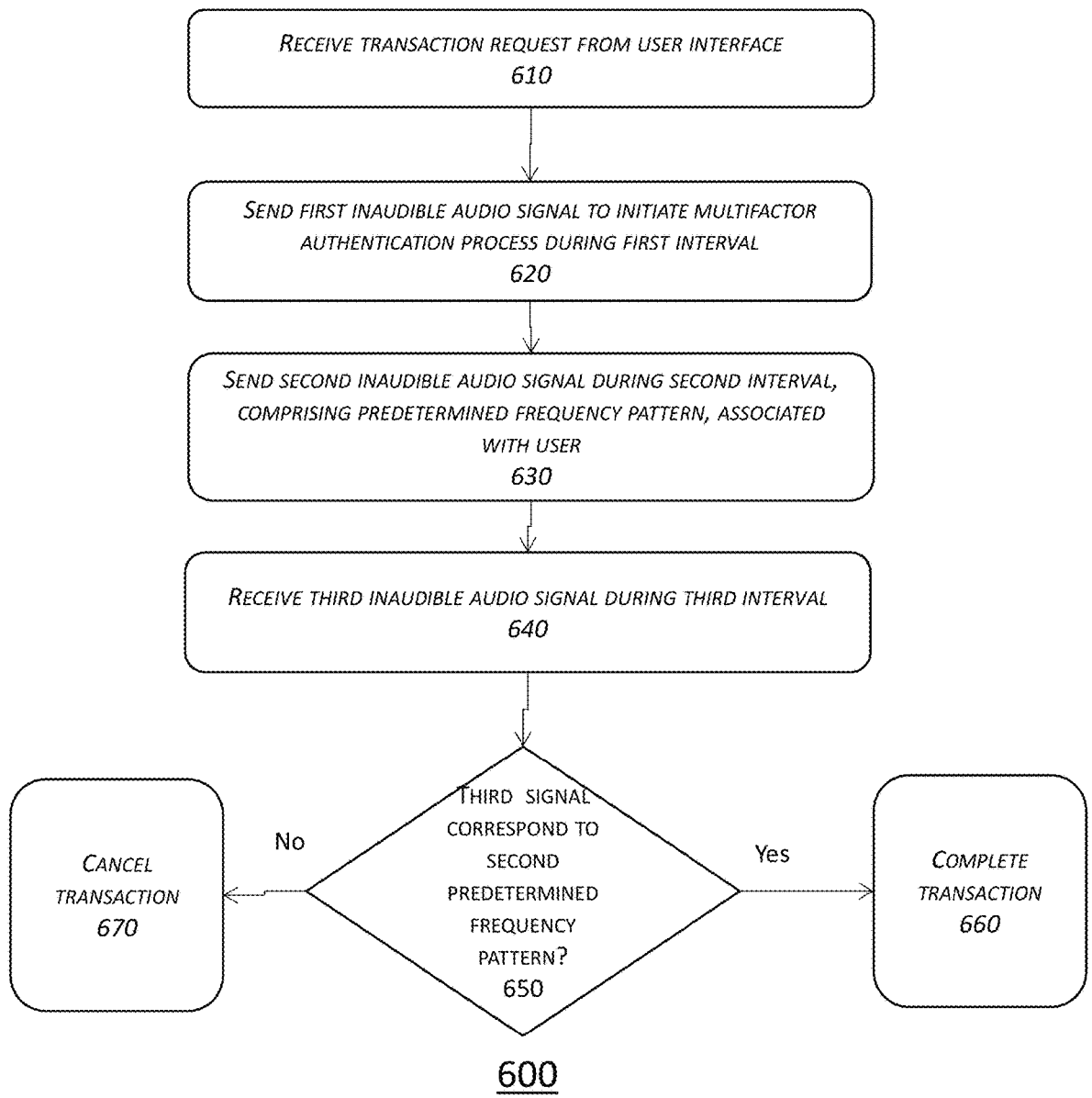
FIG. 6 illustrates an embodiment of a first logic flow.

FIG. 6 illustrates an embodiment of a logic flow 600. The logic flow 600 may be representative of some or all of the operations executed by one or more embodiments described herein. Embodiments are not limited in this context. At block 610, a transaction request is received from a user interface, such as a click on a website, presented on a display of a first user device. In some embodiments, the first user device may be a laptop computer. The click may be to select execution of a transaction, such as an online payment for a provider sponsoring the website.

At block 620 a first non-audible sound signal is transmitted to initiate a multifactor authentication process during a first interval. The first non-audible sound signal may be an ultrasonic beacon, transmitted by the first user device, and having a broadcast distance of several centimeters, 20 centimeters, 50 centimeters, 1 meter, in some embodiments.

At block 630, a second non-audible sound signal is sent during a second interval, where the second non-audible sound signal comprises a predetermined frequency pattern, associated with a user of the first user device.

At block 640, a third non-audible sound signal is received by the first user device during a third interval, subsequent to the second interval. As such, the third non-audible sound signal may be generated in response to the second non-audible sound signal.

At decision block 650, a determination is made as to whether the third non-audible sound signal corresponds to a second predetermined frequency pattern. The second predetermined frequency pattern may be derived from the predetermined frequency pattern. As such, if the third non-audible sound signal does correspond to the second predetermined frequency pattern, the flow moves to block 660, where the transaction is completed, for example, via the website provided on the first user device.

If the third non-audible sound signal does not correspond to the second predetermined frequency pattern, the first user device recognizes that this signal does not constitute authentication of the pending transaction, and the flow accordingly proceeds to block 670, where the pending transaction is canceled.

Figure 7:
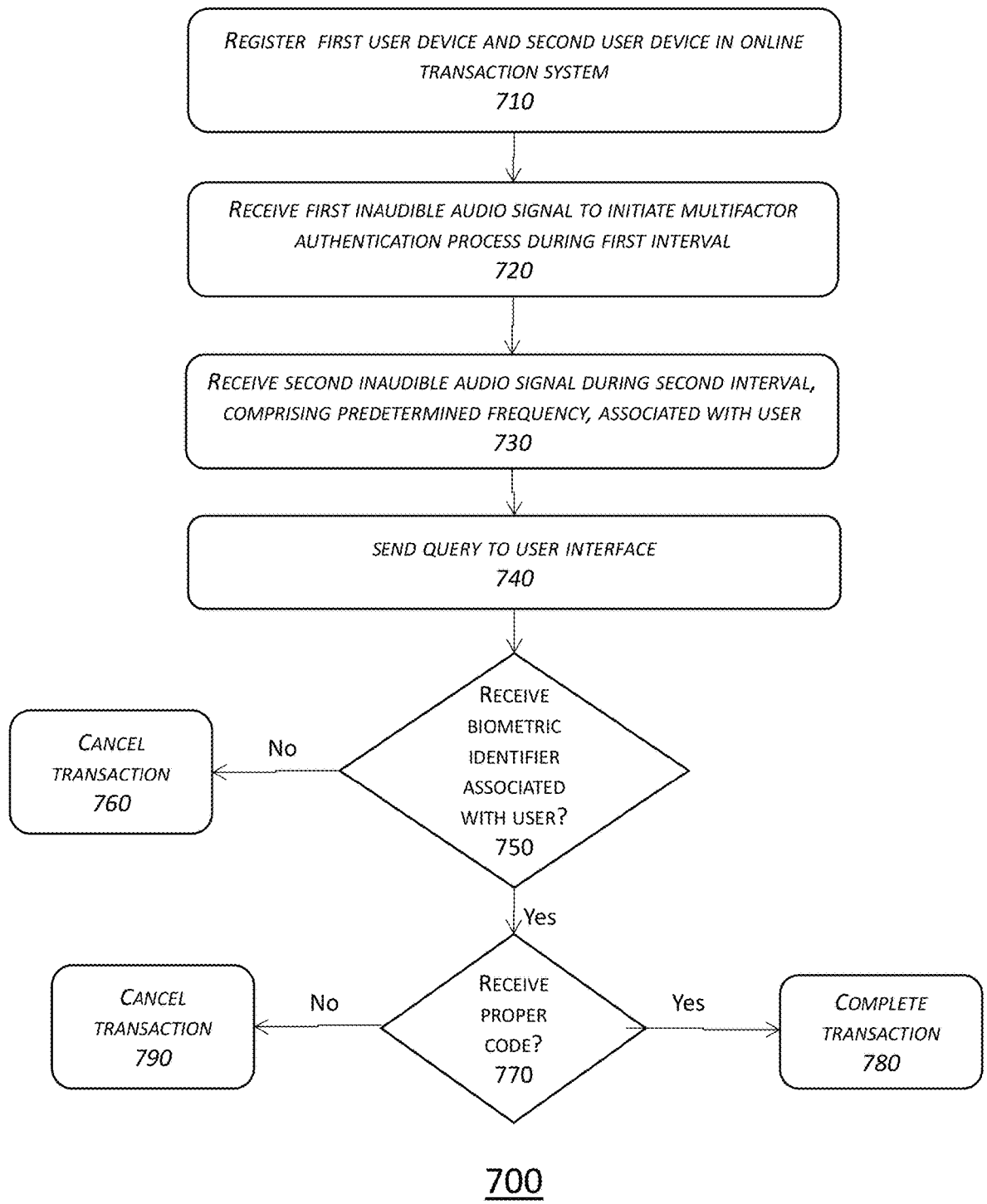
FIG. 7 illustrates an embodiment of a second logic flow.

FIG. 7 illustrates an embodiment of a logic flow 700. The logic flow 700 may be representative of some or all of the operations executed by one or more embodiments described herein. Embodiments are not limited in this context.

The flow starts at block 710, where a first user device and a second user device are registered in an online transaction system. The first user device and second user device may constitute a laptop computer and a smartphone, respectively, in one embodiment.

At block 720, a first non-audible sound signal is received to initiate a multifactor authentication process during a first interval. The multifactor authentication process may be initiated in response to a transaction to be completed by the first user device, such as a pending online purchase. The first non-audible sound signal may be received by the second user device, and may constitute an ultrasonic beacon transmitted by the first user device.

At block 730 a second non-audible sound signal is received during a second interval, where the second non-audible sound signal comprises a predetermined frequency, associated with the user of the first user device.

At block 740, a query is sent to a user interface on the second user device, responsive to receipt of the second non-audible sound signal.

The flow then proceeds to block 750, where a determination is made as to whether a biometric identifier associated with user has been received. The biometric identifier may be received over a user interface of the second user device. If not, the flow proceeds to block 760, where the transaction is canceled.

IF the biometric identifier is received, the flow proceeds to block 770, where a determination is made as to whether a proper authentication code has been received. In one embodiment, the authentication code may be generated by the first user device, and may be arranged to be entered via a user interface into the second user device.

If the proper authentication code has been received, the flow proceeds to block 780, where the transaction is completed. If the proper authentication code has not been received, the flow proceeds to block 790, where the transaction is canceled.

Figure 8:
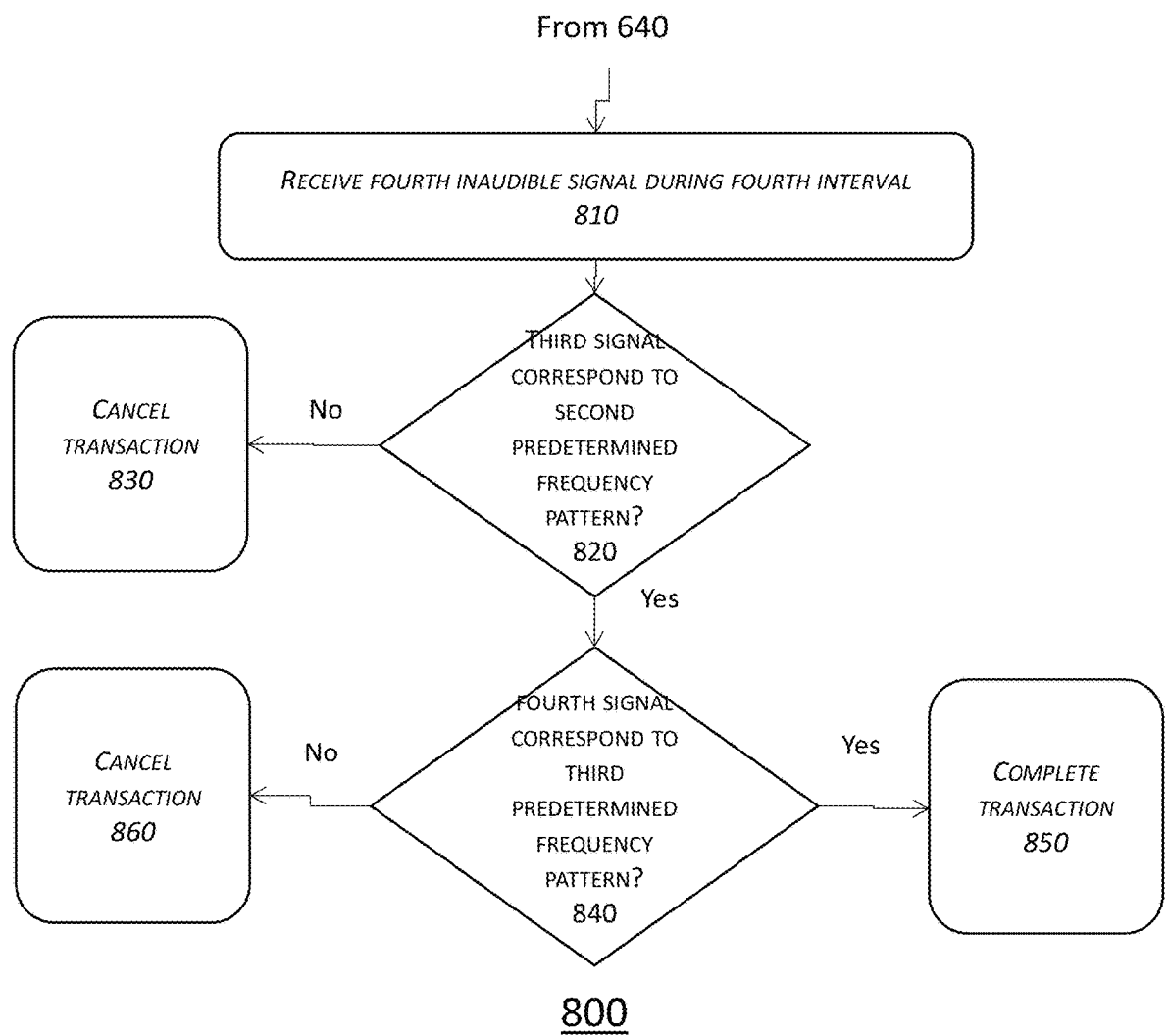
FIG. 8 illustrates an embodiment of a third logic flow.

FIG. 8 illustrates an embodiment of a logic flow 800. The logic flow 800 may be representative of some or all of the operations executed by one or more embodiments described herein. Embodiments are not limited in this context.

The logic flow 800 proceeds from block 640 of logic flow 600. At block 810, a fourth non-audible sound signal is received by the second user device during a fourth interval.

The flow then proceeds to decision block 820, where a determination is made as to whether the third non-audible sound signal corresponds to a second predetermined frequency. If not, the flow proceeds to block 830, where the transaction is canceled. If so, the flow proceeds to decision block 840.

At decision block 840, a determination is made as to whether the fourth non-audible sound signal corresponds to a third predetermined frequency pattern. If so, flow proceeds to block 850, where the transaction is completed. If not, the flow proceeds to block 860, where the transaction is canceled.

Figure 9:
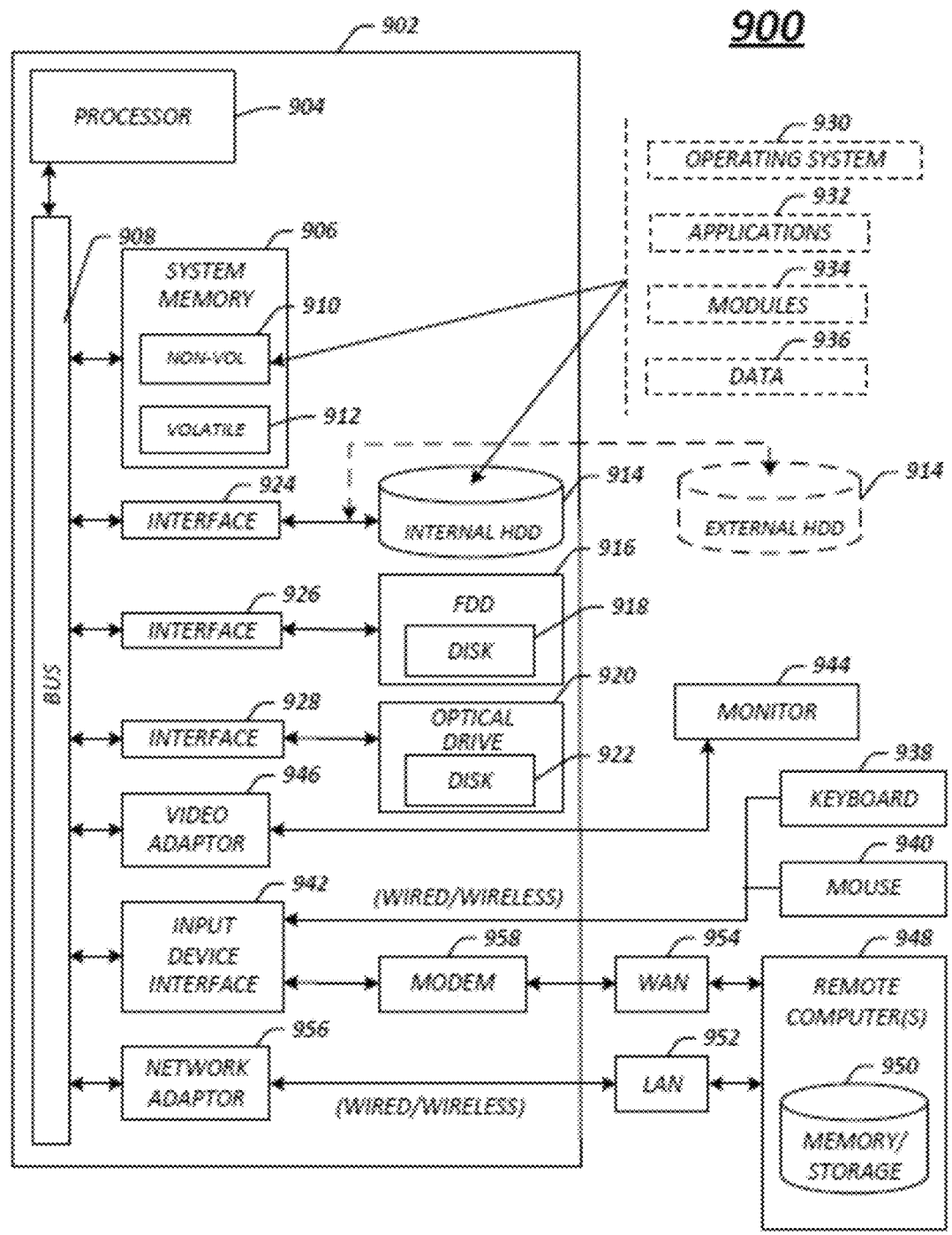
FIG. 9 illustrates an embodiment of a computing architecture.

FIG. 9 illustrates an embodiment of a computing architecture 900 comprising a computing system 902 that may be suitable for implementing various embodiments as previously described. In various embodiments, the computing architecture 900 may comprise or be implemented as part of an electronic device. In some embodiments, the computing architecture 900 may be representative, for example, of a system that implements one or more components of the multi-device authentication system 100. More generally, the computing architecture 900 is configured to implement all logic, applications, systems, methods, apparatuses, and functionality described herein with reference to FIGS. 1-8.

As used in this application, the terms "system" and "component" and "module" are intended to refer to a computer-related entity, either hardware, a combination of hardware and software, software, or software in execution, examples of which are provided by the computing architecture 900. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing system 902 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing system 902.

As shown in FIG. 9, the computing system 902 comprises a processor 904, a system memory 906 and a system bus 908. The processor 904 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core®, Core (2) Duo®, Itanium®, Pentium®, Xeon®, and XScale® processors; and similar processors. Dual microprocessors, multi-core processors, and other multi processor architectures may also be employed as the processor 904.

The system bus 908 provides an interface for system components including, but not limited to, the system memory 906 to the processor 904. The system bus 908 can be any of several types of bus structure that may further interconnect to a memory bus (with or without a memory controller), a peripheral bus, and a local bus using any of a variety of commercially available bus architectures. Interface adapters may connect to the system bus 908 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 906 can include non-volatile memory 910 and/or volatile memory 912. A basic input/output system (BIOS) can be stored in the non-volatile memory 910.

The computing system 902 may include various types of computer-readable storage media in the form of one or more lower speed memory units, including an internal (or external) hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 1394 interface technologies. The computing system 902 is generally is configured to implement all logic, systems, methods, apparatuses, and functionality described herein with reference to FIGS. 1-8.

The drives and associated computer-readable media provide volatile and/or nonvolatile storage of data, data structures, computer-executable instructions, and so forth. For example, a number of program modules can be stored in the drives and memory units (910, 912), including an operating system 930, one or more application programs 932, other program modules 934, and program data 936. In one embodiment, the one or more application programs 932, other program modules 934, and program data 936 can include, for example, the various applications and/or components of the multi-device authentication system 100, e.g., the integrated online transaction engine 110, integrated online transaction engine 110B.

A user can enter commands and information into the computing system 902 through one or more wire/wireless input devices, for example, a keyboard 938 and a pointing device, such as a mouse 940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processor 904 through an input device interface 942 that is coupled to the system bus 908, but can be connected by other interfaces such as a parallel port, IEEE 1394 serial port, a game port, a USB port, an IR interface, and so forth.

A monitor 944 or other type of display device is also connected to the system bus 908 via an interface, such as a video adaptor 946. The monitor 944 may be internal or external to the computing system 902. In addition to the monitor 944, a computer typically includes other peripheral output devices, such as speakers, printers, and so forth.

The computing system 902 may operate in a networked environment using logical connections via wire and/or wireless communications to one or more remote computers, such as a remote computer 948. The remote computer 948 can be a workstation, a server computer, a router, a personal computer, portable computer, microprocessor-based entertainment appliance, a peer device or other common network node, and typically includes many or all of the elements described relative to the computing system 902, although, for purposes of brevity, just a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computing system 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computing system 902 can include a modem 958, or is connected to a communications server on the WAN 954, or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computing system 902, or portions thereof, can be stored in the remote memory/storage device 950. It will be appreciated that the network connections shown are exemplary and other means of establishing a communications link between the computers can be used.

The computing system 902 is operable to communicate with wired and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A non-transitory computer-readable storage medium storing computer-readable program code executable by a processor causing the processor to:
   receive a transaction request from a user interface of a user device;
   receive a user-identifier from the user interface, the user-identifier associated with a user; and
   initiate a multifactor authentication process responsive to receipt of the user-identifier, the multifactor authentication process comprising a plurality of communications to be conducted over a non-audible frequency interface of the user device,
   wherein the programming code to perform the multifactor authentication process, causes the processor to:
      send a first non-audible sound signal during a first interval;
      send a second non-audible sound signal during a second interval, the second non-audible sound signal comprising a predetermined frequency pattern associated with the user; and
      receive a different non-audible sound signal as a third non-audible sound signal, the third non-audible sound signal, at least in part, utilized to determine whether to complete the transaction request or not.

2. The non-transitory computer-readable storage medium of claim 1, wherein the first non-audible sound signal, the second non-audible sound signal, and the third non-audible sound signal comprise a frequency greater than 15 kHz.

3. The non-transitory computer-readable storage medium of claim 1, the computer-readable program code executable by the processor to:
send instructions to complete the transaction request, responsive to the third non-audible sound signal, when the third non-audible sound signal corresponds to a second predetermined frequency pattern, derived from the predetermined frequency pattern.

4. The non-transitory computer-readable storage medium of claim 1, the computer-readable program code executable by the processor to:
receive a fourth non-audible sound signal, sent during a fourth interval; and send instructions to complete the transaction request, responsive to the third non-audible sound signal, and the fourth non-audible sound signal, when the fourth non-audible sound signal corresponds to a third predetermined frequency pattern, derived from the predetermined frequency pattern.

5. The non-transitory computer-readable storage medium of claim 1, the computer-readable program code executable by the processor to:
ignore the third non-audible sound signal, when the third non-audible sound signal does not correspond to a second predetermined frequency pattern.

6. The non-transitory computer-readable storage medium of claim 1, wherein the second non-audible sound signal comprises an ultrasonic beacon, broadcast within a frequency range, having a lower limit greater than 15 kHz.

7. The non-transitory computer-readable storage medium of claim 1, wherein the predetermined frequency pattern of the second non-audible sound signal comprises a first frequency pattern, and wherein the third non-audible sound signal comprises a second frequency pattern, different from the first frequency pattern.

8. A device, comprising:
a user interface;
an audio interface, coupled to the user interface, and comprising an audio receiver and an audio transmitter;
a processor, coupled to the user interface and the audio interface; and
a non-transitory computer-readable storage medium storing computer-readable program code executable by the processor to:
receive an enable signal over the user interface to enable a multifactor authentication application;
receive, during a first interval, a first non-audible sound signal from the audio interface to initiate a multifactor authentication process, wherein the multifactor authentication process is based upon a predetermined frequency pattern;
receive a second non-audible sound signal over the audio interface during a second interval, the second non-audible sound signal comprising the predetermined frequency pattern, the predetermined frequency pattern being associated with a user;
request receipt of a user-identifier signal, associated with the user, in response to receipt of the predetermined frequency pattern; and
transmit an authentication signal indicating a transaction request is complete, responsive to receipt of a user-identifier signal over the user interface.

9. The device of claim 8, wherein the second non-audible sound signal comprises an ultrasonic beacon, broadcast within a frequency range, having a lower limit greater than 15 kHz.

10. The device of claim 8, wherein the authentication signal comprises an electronic signal, electric signal, or electromagnetic signal, to be transmitted over a data network.

11. The device of claim 8, the user-identifier signal comprising an authentication code.

12. The device of claim 8, wherein the user interface comprising at least one of: a touchscreen, a keypad, a touchpad, a biometric interface, a keyboard, an audio device, and a button, wherein the user-identifier signal being received from the biometric interface.

13. The device of claim 8, wherein the authentication signal comprises a third non-audible sound signal, sent over the audio interface at a second predetermined frequency pattern, the second predetermined frequency pattern being derived from the predetermined frequency pattern.

14. The device of claim 8, wherein the first non-audible sound signal and the second non-audible sound signal comprise a frequency greater than 15 kHz.

15. The device of claim 8, wherein transmitting the authentication signal further comprises:
send instructions to complete the transaction request, responsive to a third non-audible sound signal, when the third non-audible sound signal corresponds to a second predetermined frequency pattern, derived from the predetermined frequency pattern.

16. The device of claim 15, wherein:
the predetermined frequency pattern of the second non-audible sound signal comprises a first frequency pattern, and
the third non-audible sound signal comprises a second frequency pattern, different from the first frequency pattern.

17. A method, comprising:
receiving a transaction request from a user interface;
receiving a user-identifier from the user interface, the user-identifier associated with a user;
sending a first non-audible sound signal to initiate a multifactor authentication process during a first interval
sending a second non-audible sound signal during a second interval, the second non-audible sound signal comprising a predetermined frequency pattern associated with the user; and
receiving, during a third interval, a different non-audible sound signal as a third non-audible sound signal, wherein the third non-audible sound signal, at least in part, is utilized to determine whether to complete the transaction request or not.

18. The method of claim 17,
wherein the first non-audible sound signal, the second non-audible sound signal, and the third non-audible sound signal comprise a frequency greater than 15 kHz.

19. The method of claim 17, comprising:
sending instructions to complete the transaction request, responsive to the third non-audible sound signal, when the third non-audible sound signal corresponds to a second predetermined frequency pattern, derived from the predetermined frequency pattern.

20. The method of claim 17, comprising:
ignoring the third non-audible sound signal, when the third non-audible sound signal does not correspond to a second predetermined frequency pattern.

* * * * *